(12) United States Patent
Yamamoto et al.

(10) Patent No.: US 10,562,136 B2
(45) Date of Patent: Feb. 18, 2020

(54) METHOD OF FORMING A SEAT FRAME OF A VEHICLE SEAT, SEAT FRAME FOR USE IN VEHICLE SEAT, AND VEHICLE SEAT HAVING THE SEAT FRAME

(71) Applicant: TACHI-S CO., LTD., Akishima-shi, Tokyo (JP)

(72) Inventors: Hiromi Yamamoto, Ome (JP); Yasushi Kaku, Ome (JP)

(73) Assignee: TACHI-S CO., LTD., Tokyo (JP)

( * ) Notice: Subject to any disclaimer, the term of this patent is extended or adjusted under 35 U.S.C. 154(b) by 608 days.

(21) Appl. No.: 15/353,233

(22) Filed: Nov. 16, 2016

(65) Prior Publication Data

US 2017/0057022 A1   Mar. 2, 2017

Related U.S. Application Data

(62) Division of application No. 14/595,527, filed on Jan. 13, 2015, now abandoned.

(30) Foreign Application Priority Data

Jan. 29, 2014 (JP) ................. 2014-013867

(51) Int. Cl.
*B23K 37/04* (2006.01)
*B23K 26/21* (2014.01)
(Continued)

(52) U.S. Cl.
CPC .......... *B23K 37/0443* (2013.01); *B21D 53/88* (2013.01); *B23K 26/20* (2013.01);
(Continued)

(58) Field of Classification Search
None
See application file for complete search history.

(56) References Cited

U.S. PATENT DOCUMENTS 4,373,245 A   2/1983   Volpe
4,544,204 A   10/1985  Schmale
(Continued)

FOREIGN PATENT DOCUMENTS

JP   2006051272 A   2/2006
JP   2010046162 A   3/2010
JP   2010234412 A1  10/2010

OTHER PUBLICATIONS

USPTO Non-Final Office Action corresponding to U.S. Appl. No. 14/595,527; dated Oct. 24, 2017.
(Continued)

*Primary Examiner* — Geoffrey S Evans
(74) *Attorney, Agent, or Firm* — Cantor Colburn LLP

(57) ABSTRACT

A plate is continuously press-bent, into a shaped member having a recess opening at one surface (i.e., lower surface). Then, the plate is bent back by pressing, at the front and rear ends, covering the openings of the recess and a side frame having open cross sections, each with a gap, is thereby formed. In the forming step, the side frame is not welded and has open cross sections, each with a gap. The side frames are then subjected to the next step (i.e., step of assembling the seat frame). In the step of assembling the seat frame, the side frames and coupling members are welded together, constituting a substantially rectangular seat frame. As the side frames are so welded in step of assembling the seat frame, a rigid structure each having closed cross sections with no gaps is formed.

7 Claims, 7 Drawing Sheets

(51) Int. Cl.
*B60N 2/68* (2006.01)
*B60N 2/64* (2006.01)
*B23K 26/20* (2014.01)
*B21D 53/88* (2006.01)
*B23K 101/00* (2006.01)
*B23K 101/24* (2006.01)
*B23K 101/28* (2006.01)
*B23K 101/18* (2006.01)
*B23K 103/04* (2006.01)

(52) U.S. Cl.
CPC ............... *B23K 26/21* (2015.10); *B60N 2/64* (2013.01); *B60N 2/682* (2013.01); *B23K 2101/006* (2018.08); *B23K 2101/185* (2018.08); *B23K 2101/24* (2018.08); *B23K 2101/28* (2018.08); *B23K 2103/04* (2018.08)

(56) References Cited

U.S. PATENT DOCUMENTS

| | | | | |
|---|---|---|---|---|
| 4,629,109 | A | * | 12/1986 | Matsushita .......... B23K 37/053 228/32 |
| 4,911,352 | A | * | 3/1990 | Urai .................. B60N 2/06 228/119 |
| 5,005,908 | A | | 4/1991 | Young |
| 6,286,902 | B1 | | 9/2001 | Yoshimura |
| 6,375,267 | B1 | | 4/2002 | Ishikawa |
| 8,132,862 | B2 | | 3/2012 | Yamada et al. |
| 8,459,747 | B2 | | 6/2013 | Watanabe |
| 8,888,177 | B2 | | 11/2014 | Kaku et al. |
| 2002/0135222 | A1 | | 9/2002 | Matsunuma |
| 2004/0113481 | A1 | | 6/2004 | Saberan et al. |
| 2006/0175887 | A1 | | 8/2006 | Behrens |
| 2008/0084086 | A1 | * | 4/2008 | Endo .................. B60N 2/002 296/68.1 |
| 2008/0277993 | A1 | | 11/2008 | Blankart |
| 2009/0108661 | A1 | | 4/2009 | Ishijima et al. |
| 2009/0289491 | A1 | | 11/2009 | Nakagaki |
| 2010/0096895 | A1 | | 4/2010 | Nonomiya |
| 2010/0096896 | A1 | | 4/2010 | Nonomiya |
| 2010/0187886 | A1 | | 7/2010 | Yamada et al. |
| 2010/0187887 | A1 | * | 7/2010 | Yamada .................. B60N 2/22 297/354.12 |
| 2011/0043022 | A1 | | 2/2011 | Nasshan et al. |
| 2011/0278892 | A1 | * | 11/2011 | Kroener ............... B23K 20/122 297/344.1 |
| 2013/0140868 | A1 | | 6/2013 | Muck et al. |
| 2013/0161992 | A1 | | 6/2013 | Zekavica et al. |
| 2013/0200677 | A1 | | 8/2013 | Hoshi et al. |
| 2013/0221725 | A1 | | 8/2013 | Yamada et al. |
| 2013/0328375 | A1 | | 12/2013 | Zekavica et al. |
| 2014/0232161 | A1 | | 8/2014 | Mitsuhashi |
| 2014/0328614 | A1 | | 11/2014 | Fleischheuer et al. |
| 2014/0375106 | A1 | | 12/2014 | Yamada et al. |
| 2015/0091359 | A1 | | 4/2015 | Kitou |
| 2015/0203011 | A1 | | 7/2015 | Fujita et al. |
| 2015/0203012 | A1 | | 7/2015 | Fujita et al. |
| 2015/0231997 | A1 | | 8/2015 | Itoi et al. |
| 2015/0291072 | A1 | | 10/2015 | Ito |
| 2015/0307005 | A1 | | 10/2015 | Dill et al. |
| 2016/0074962 | A1 | | 3/2016 | Koenig |
| 2016/0207435 | A1 | | 7/2016 | Bagin et al. |

OTHER PUBLICATIONS

U.S.P.T.O. Final Office Action corresponding to U.S. Appl. No. 14/595,527; dated Jun. 12, 2017.
Notification of Reasons for Refusal for corresponding Japanese Application No. 2014-013867; dated Jul. 10, 2017.
U.S. Non-Final Office Action corresponding to U.S. Appl. No. 14/595,527; dated Nov. 25, 2016.

* cited by examiner

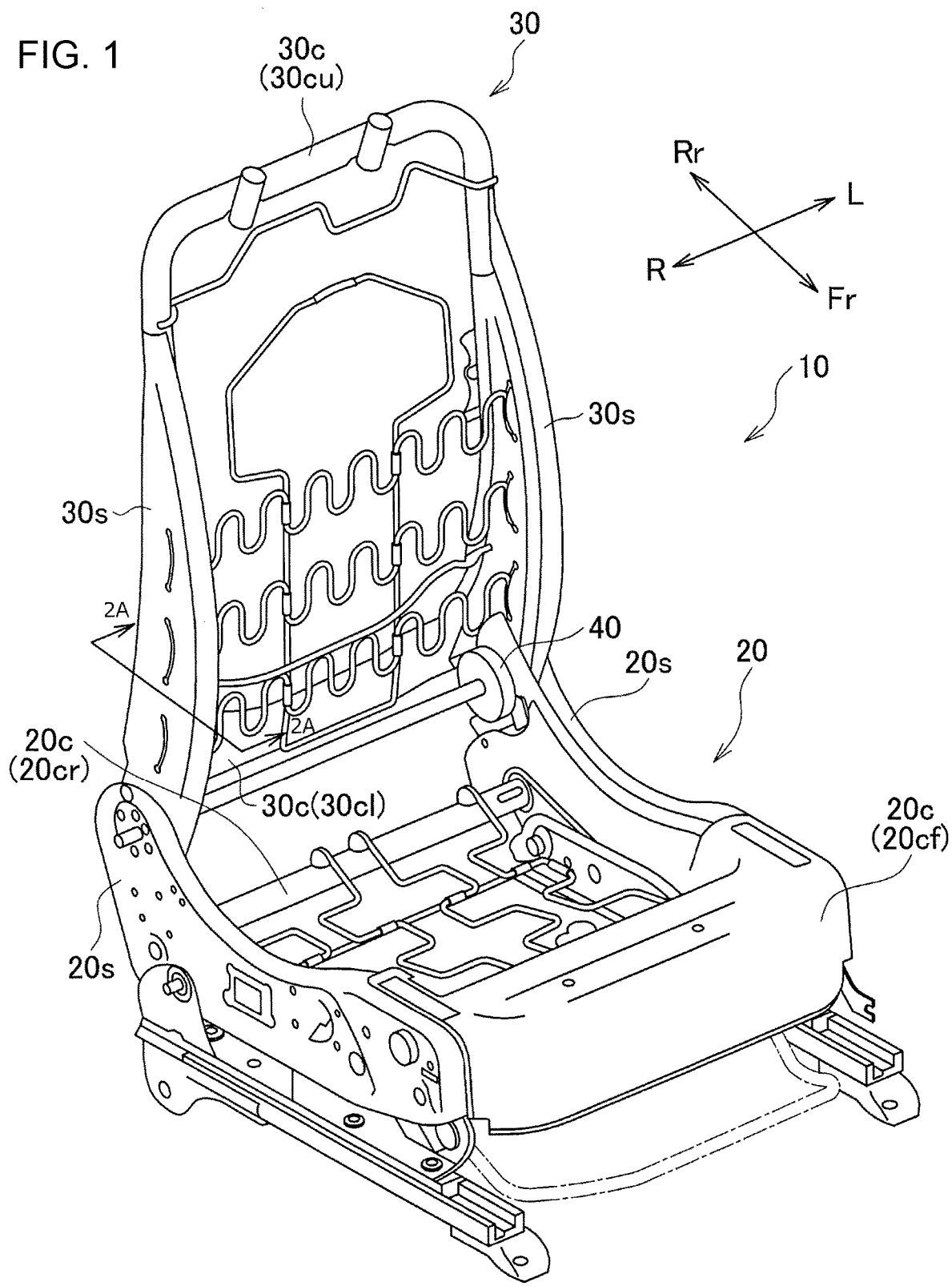

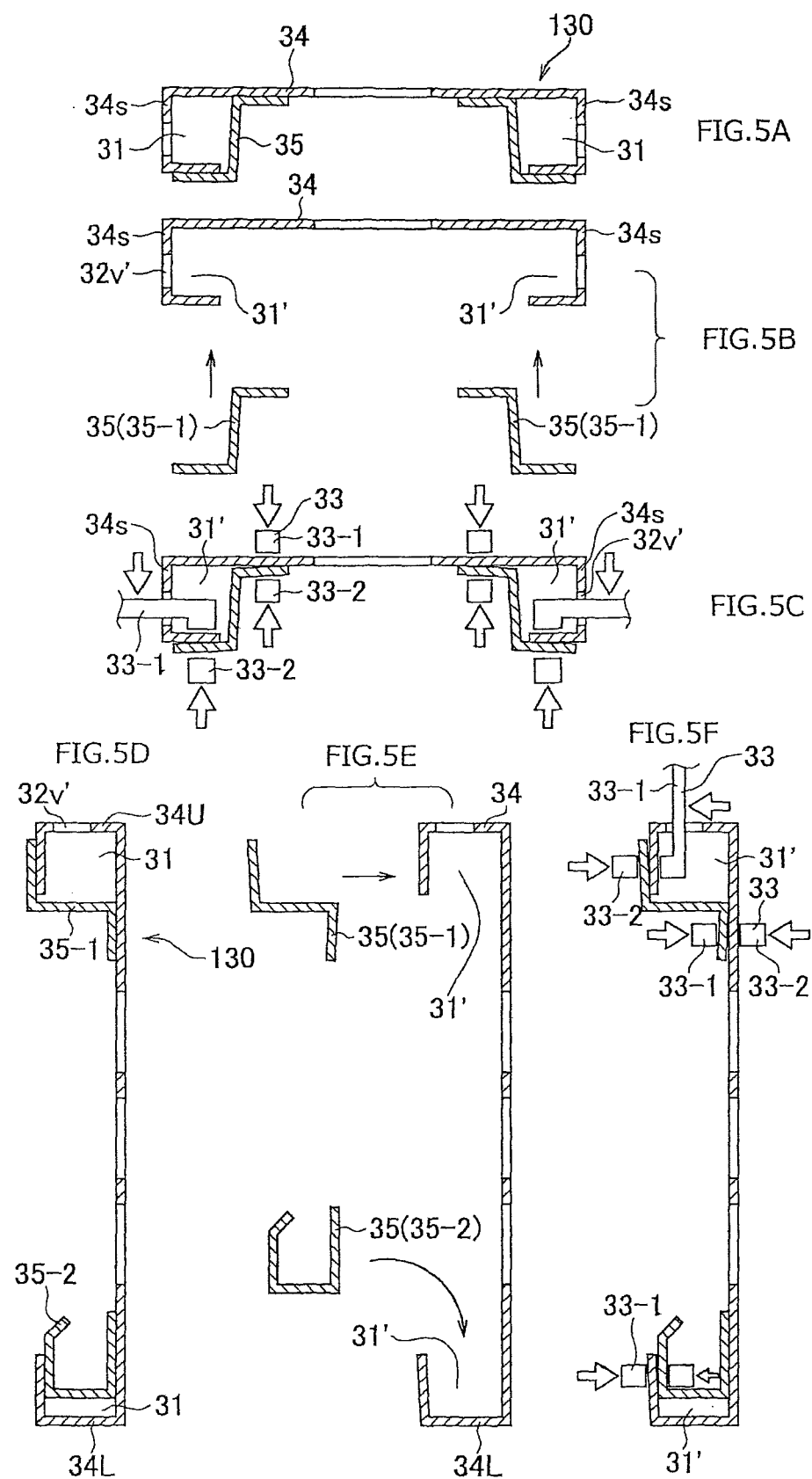

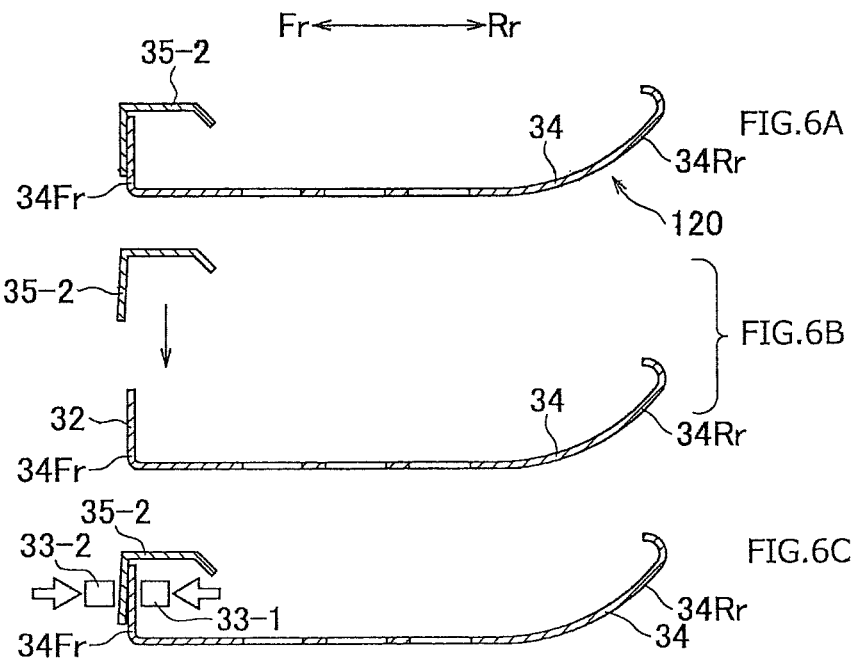
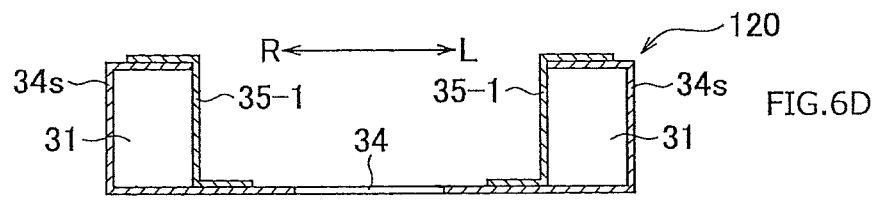
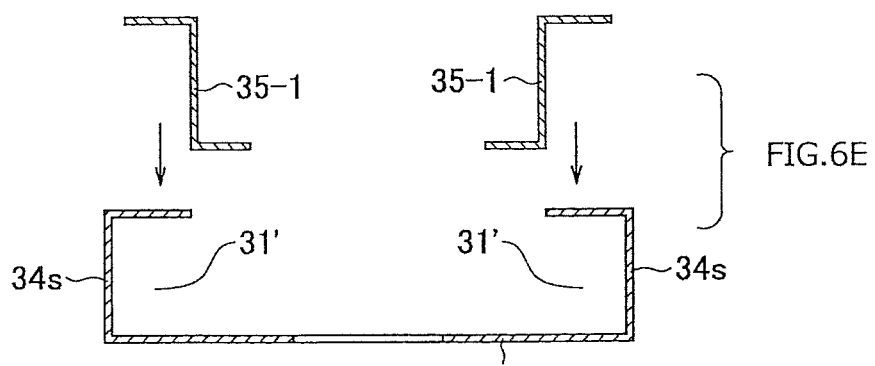
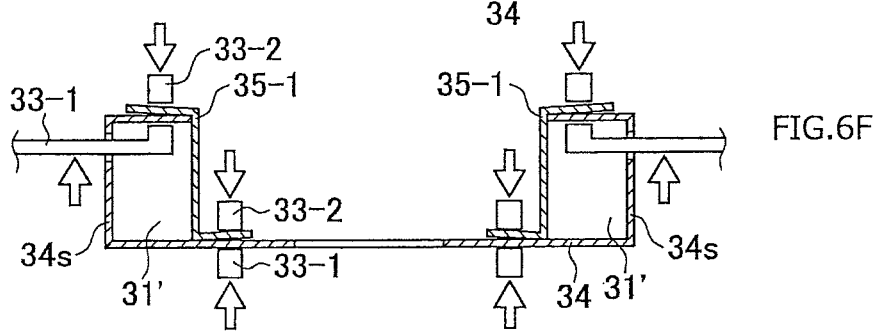

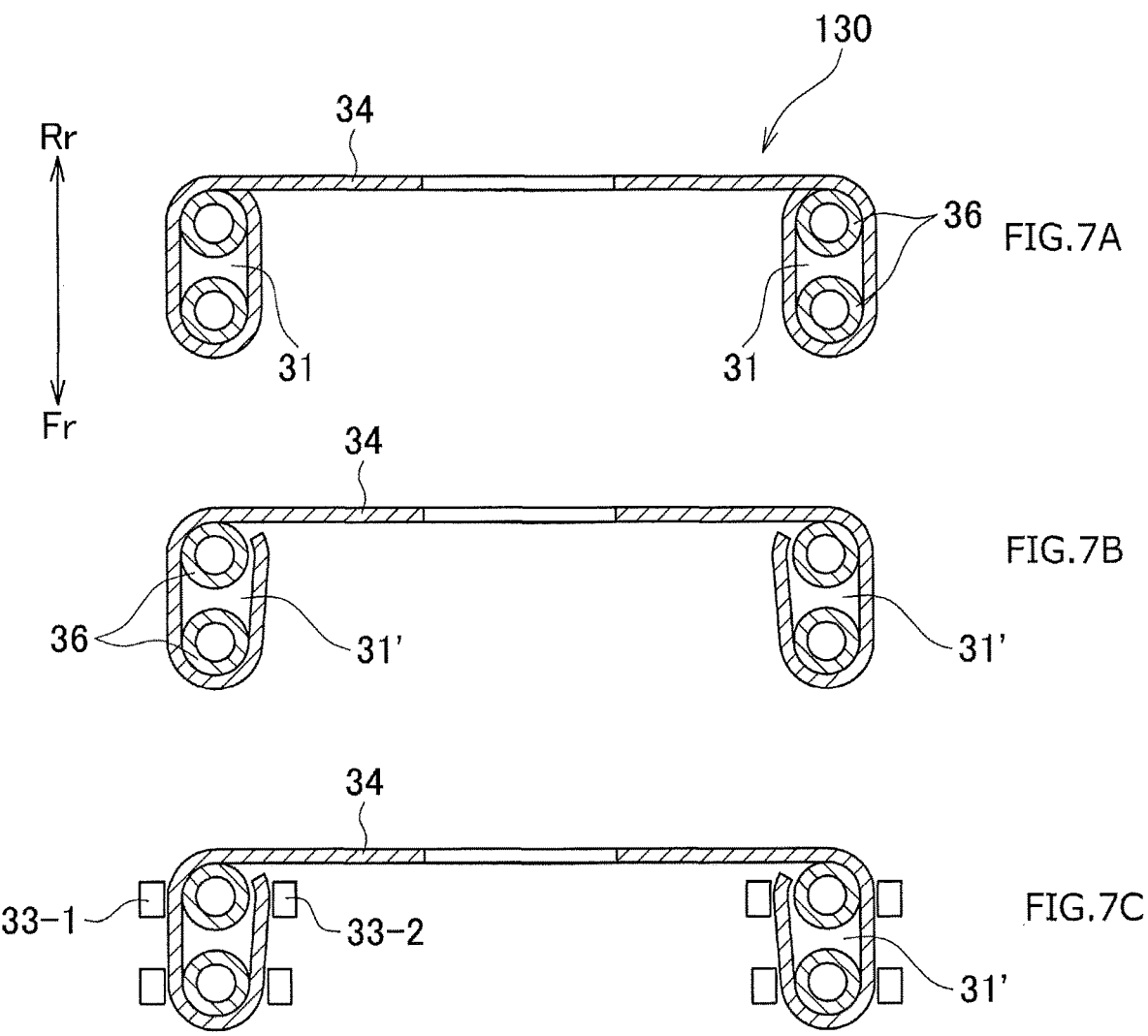

METHOD OF FORMING A SEAT FRAME OF A VEHICLE SEAT, SEAT FRAME FOR USE IN VEHICLE SEAT, AND VEHICLE SEAT HAVING THE SEAT FRAME

CROSS-REFERENCE TO RELATED APPLICATIONS

The present application is a divisional application of U.S. patent application Ser. No. 14/595,527, filed on Jan. 13, 2015 and currently abandoned, the entire contents of which are incorporated herein by reference. The Ser. No. 14/595,527 application claimed the benefit of the date of the earlier filed Japanese Patent Application No. 2014-013867, filed Jan. 29, 2014, priority to which is also claimed herein, and the contents of which are also incorporated by reference herein.

BACKGROUND OF THE INVENTION

Technical Field

This invention relates to a method of forming a seat frame of vehicle seat, to a seat frame for use in a vehicle seat, and to a vehicle seat having the seat frame.

Description of the Related Art

A vehicle seat comprises a seat cushion and a seatback. The frames of the seat cushion and seatback (called seat cushion frame and seatback frame, respectively) need to have sufficient rigidity. A seat frame shaped like a rectangular frame is known, having coupling members that connect the left and right side frames together. The seat frame therefore has sufficient rigidity.

The left and right side frames are made of so-called tailored blanks, each composed of a plurality of steel plates butting one another and welded to one another at mutually abutting parts (line-welded or primary welded). The front and rear ends of each plate are bent by means of pressing, forming flanges. Thus, the plate defines transverse cross sections shaped like letter U. Having cross sections shaped like letter U (as viewed in the front-rear direction), the side frames have a large section modulus, and are very rigid to a bending moment.

The coupling members are made of a steel plate or a steel pipe, and extend between the left and right side frames. The left and right side frames, each having U-shaped cross sections, are coupled together by the coupling members by means of welding. So coupled together, the left and right side frames constitute a substantially rectangular seat frame.

Both the seatback frame and the seat cushion frame are substantially rectangular frames, each composed of left and right side frames and coupling members extending between, and coupled to, the left and right side frames. More precisely, the seatback frame is composed of left and right side frames, an upper frame extending between, and coupled to, the upper ends of the left and right side frames, and is therefore a substantially rectangular frame. Similarly, the seat cushion frame is composed of left and right side frames, a front frame coupled to the front ends of the left and right side frames, and a rear frame coupled to the rear ends of the left and right side frames. The seat cushion frame is therefore a substantially rectangular frame. The upper frame, lower frame, front frame and rear frame are coupling members.

In most cases, the seatback frame has its lower edge coupled to the rear edge of the seat cushion. A bending moment therefore acts on the seat side frame, gradually increasing from the upper edge of the seat side frame toward the lower edge thereof. This is why a plate being gradually thicker from the upper edge toward the lower edge, and therefore having a large section modulus and hence high strength may be used as disclosed in JP 2006-051272A. The plate constitutes a side frame that changes in rigidity as the bending moment acting on it changes.

JP 2010-046162A discloses a plate having a uniform thickness may have its front and rear ends bent by pressing, forming two U-shaped members at ends, respectively. The opening of either U-shaped member is covered with a plate having a flange. Or, the front and rear ends of the plate are bent back, closing the openings of the U-shaped members. As a result, a side frame is formed, the front and rear ends of which has a substantially rectangular cross section completely closed (i.e., closed cross section). Not only having a closed cross section, the front and rear ends of the side frame are welded and thereby made more rigid.

In the configuration disclosed in JP 2010-046162A, the plate of the side frame can be changed in thickness or material in accordance with the distribution of bending moment acting on it. The plate therefore need not be thick or made of strong material, from the upper edge to the lower edge. Thus, the plate can form a side frame that has rigidity corresponding to the bending moment acting on it, ultimately providing a seat frame. However, the welding process performed before the pressing process is complicated, because the plates welded together differ in thickness or material. Inevitably, the side frame, and hence seat frame, cannot be produced at low cost. Further, any plate made of strong material is expensive. Although a part of each plate, consisting the side frame, is made of strong material, the seat frame cannot be produced at low cost.

In the configuration disclosed in JP 2010-046162A, the side frame has two closed cross sections at the front and rear ends, respectively. That is, the side frame can be composed of plates, each being uniform in both thickness and material. In addition, the welding process performed before the pressing process is not complicated, and a side frame having a large section modulus can be manufactured at low cost. Moreover, the side frame can be thin and light, because it can yet have a large section modulus and a sufficient rigidity though it is not constituted by thick plates.

The front and rear ends of each plate are not only bent, but also welded, forming two closed cross sections and ultimately providing a rigid structure (namely, each plate has two closed cross sections). A side frame, if constituted by such plates, can have high rigidity, hardly deformed by the bending moment acting on it. The pressing process alone can hardly provide plates having cross sections completely closed. This is why in the configuration of JP 2010-046162A, the front and rear ends of each plate are bent back in the pressing process and are then welded, defining closed cross sections that make the plate rigid.

The welding process (i.e., secondary welding process) of providing closed cross sections is, however, a process performed in addition to the pressing process indispensable to form the side frame. The welding process inevitably raises the cost of manufacturing the seat frame, and ultimately inevitably increases the cost of manufacturing the vehicle seat having the seat fame.

An object of this invention is to provide a method for forming the seat frame of a vehicle seat, in which the side frames can have closed cross sections, without performing any additional process (i.e., secondary welding process).

Another object of this invention is to provide a seat frame for use in the vehicle seat, the seat frame having side frames with closed cross sections without performing any additional process (i.e., secondary welding process).

Still another object of this invention is to provide a vehicle seat having the seat frame having side frames that with cross sections, without performing any additional process (i.e., secondary welding process).

SUMMARY OF THE INVENTION

In this invention, no welding process is performed to provide closed cross sections in the step of forming the side frames. Instead, the welding process for provide closed cross sections is performed when the left and right side frames are welded to coupling members.

To achieve the object specified above, in the method of forming a seat frame of a vehicle seat according to the invention of claim 1, a method of forming a seat frame of a vehicle seat, by arranging coupling members between left and right side frames formed of plates, welding the coupling members to the left and right side frames, thereby assembling a substantially rectangular seat frame, the method comprising: bending the front and rear ends of each side frame formed of a plate to a same direction, providing open cross sections, each with a gap, between one surface of the side frame and, the front and rear ends of the side frame; and welding each side frame in a step of assembling the seat frame, providing closed cross sections and thereby forming a rigid structure having no gaps.

In the invention of claim 1, each side frame is formed, leaving a gap in the cross section provided at the either end. The side frame is welded in the step of assembling the seat frame, thereby closing the cross sections. Thus, in this invention, two closed sections are provided in the front and rear ends of either side frame, without performing an additional welding (i.e., secondary welding) in the step of forming the side frames. The welding performed, in the step of assembling the seat frame, to close the cross sections provided in the ends of either side frame is an additional process (i.e., secondary welding) easy to perform, unlike the independent welding performed to form side frames in the step of assembling the seat frame. Since any additional process (e.g., secondary welding) is unnecessary, the side frames can be manufactured at low cost. As a result, the seat frame comprising the side frames, and hence the vehicle seat comprising the seat frame, can be manufactured at low cost.

BRIEF DESCRIPTION OF THE DRAWINGS

FIG. 1 is a perspective view of a vehicle seat incorporating a seat frame formed by a method according to Embodiment 1 of this invention;

FIGS. 5A and 5D are sectional views of the seat frame (the seatback frame), respectively taken along line 5A-5A and line 5D-5D shown in FIG. 4;

FIGS. 5B and 5E are sectional views of the seat frame in the forming step, showing the parts respectively corresponding to those shown in FIGS. 5A and 5D;

FIGS. 5C and 5F are sectional views of the seat frame in the assembling step, showing the parts respectively corresponding to those shown in FIGS. 5A and 5D;

FIGS. 6A and 6D are sectional views of the seat frame (the seat cushion frame), taken along line 6A-6A and line 6D-6D shown in FIG. 4, respectively;

FIGS. 6B and 6E are sectional views of the seat frame in the forming step, showing the parts respectively corresponding to those shown in FIGS. 6A and 6D;

FIGS. 6C and 6F are sectional views of the seat frame in the assembling step, showing the parts respectively corresponding to those shown in FIGS. 6A and 6D; and FIGS. 7A, 7B and 7C are sectional views of a modification of Embodiment 2, and correspond to FIGS. 5A, 5B and 5C, respectively.

DETAILED DESCRIPTION OF THE INVENTION

Embodiment 1

Figure 2A:
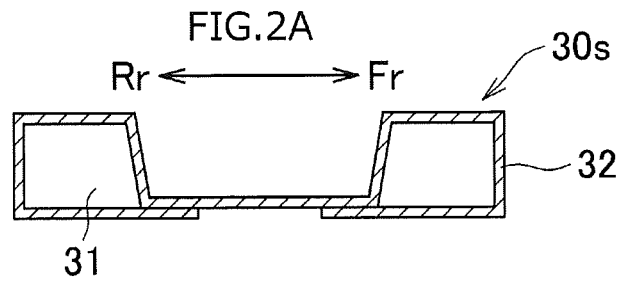
FIG. 2A is a sectional view of a side frame of a seatback frame, taken along line 2A-2A shown in FIG. 1.

Embodiment 1 of this invention will be described in detail with reference to the accompanying drawings. In the drawings, Fr and Rr indicate the forward and backward directions with respect to the occupant of a vehicle seat 10, and L and R indicate the leftward and rightward directions with respect to the occupant.

As shown in FIG. 1, the vehicle seat 10 comprises two seat frames, i.e., seat cushion frame 20 and seatback frame 30. The seatback frame 30 is coupled at lower edge to the rear edge of the seat cushion frame 20 by, for example, a reclining device 40, and can therefore incline with respect to the cushion frame 20.

The seat cushion frame 20 comprises left and right side frames 20s, and two coupling members 20c extending between the left and right side frames 20s and welded thereto. Similarly, the seatback frame 30 comprises left and right side frames 30s, and two coupling members 30c extending between the left and right side frames 30s and welded thereto. Both the seat cushion frame 20 and the seatback frame 30 are therefore shaped like a substantially rectangular frame.

The left and right side frames 20s and the left and right side frames 30s are so-called tailored blanks, each composed of a plurality of steel plates butting one another and welded to one another at mutually abutting parts (line-welded). The front and rear ends of each plate are bent, by pressing. The side frames 20s and the side frames 30s are not limited to tailored blanks, though they are tailored blanks in in most cases.

The seat cushion frame 20 comprises two coupling members 20c, and the seatback frame 30 comprises two coupling members 30c. The coupling members 20c and 30c are steel plates or steel pipes. In the seat cushion frame 20, a front frame 20*cf* extends between, and is welded to, the front ends of the left and right frames 20*s*, and a rear frame 20*cr* extends between, and is welded to, the rear ends of the left and right frames 20*s*. As a result, the seat cushion frame (seat frame) 20 is a substantially rectangular frame. In the seatback frame 30, a lower frame 30*cl* extends between, and is welded to, the lower ends of the left and right side frames 30*s*, and an upper frame 30*cu* extends between, and is welded to, the upper ends of the left and right side frames 30*s*.

In the step of assembling the seat frame, the coupling members are welded to the side frames, by means of laser welding, arc welding or spot welding, as the case may be.

Needless to say, the vehicle seat 10 comprises a seat pad, a trim cover, a seat cushion, and a seatback. The seat pad is mounted on the seat cushion frame 20 and seatback frame 30, which constitute the skeleton. The seat cushion and seatback are formed by covering the seat pad with a trim cover.

As shown in FIGS. 2A to 2D, the side frames 30*s* of the seatback frame have, at front and rear ends, closed cross sections 31. The closed cross sections 31 have a gap each, in the step of forming the side frames. Each closed cross section 31 is defined when the side frames 30*s* and the coupling members (i.e., upper frame 30*cu* and lower frame 30*cl*) are welded to each other, forming a rigid structure, and remains in the rigid structure so formed. The cross section 31 is thus closed.

Figure 2B:
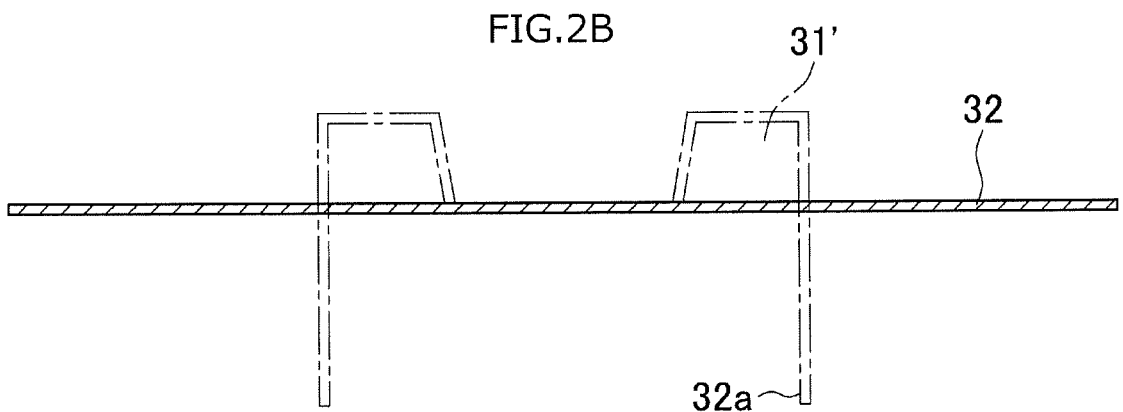
FIGS. 2B and 2C are sectional views of a side frame undergoing the pressing process in the step of forming the side frame.
Figure 2C:
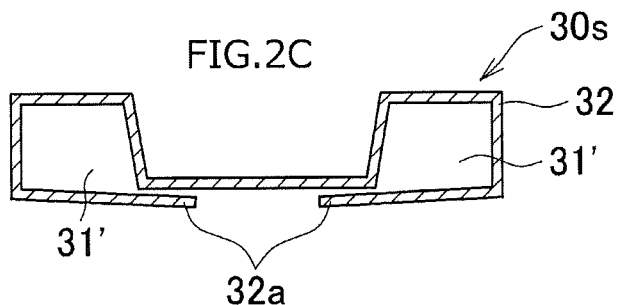

In the step of forming the side frames 30*s*, one plate 32 is continuously press-bent, into a shaped member having a recess (U-shaped recess) 31' opening at one surface (i.e., lower surface in FIG. 2B). Then, the plate 32 is bent back by pressing at the front and rear ends 32*a*, and covers the openings of the recess 31'. In the pressing process, it is difficult to make the front and rear ends of the plate 32 contact the opposing surfaces, e.g., the middle horizontal part of the plate. The recess 31' cannot be completely closed. Consequently, each side frame 30*s* has cross sections, each having a gap, at the front and rear ends of side frame (see FIG. 2C). Thus, the side frames 30*s* do not have closed cross sections, namely cross sections without gaps, in the step of forming the side frames. The side frames 30*s* are then subjected to the next step (i.e., step of assembling the seat frame.)

In the step of assembling the seat frame, the side frames 30*s* and the coupling members (each composed of an upper frame 30*cu* and a lower frame 30*cl*) are welded together, constituting the seat frame. As the side frames 30*s* are welded to the coupling members, they become rigid structures each having closed cross sections with no gaps. (Namely, closed cross sections 31 are provided in each side frame.)

In the step of assembling the seat frame, the side frames are welded by means of laser welding in most cases. In the laser welding it is required that any two members to weld together should be spaced by 0.1 mm or less. In the pressing process, however, it is difficult to space two members by 0.1 mm or less. Further, the backlash of the plate 32 (constituent member) is unavoidable in the pressing process. The welding (i.e., laser welding) is therefore performed, while jigs are pushing the parts of the plate 32 onto one another, thereby keeping the gaps between the parts of the plate 32 at 0.1 mm or less.

Figure 2D:
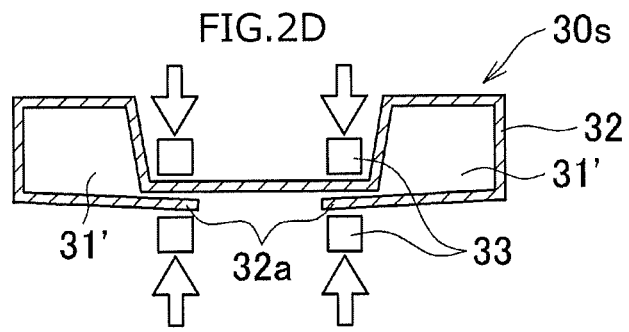
FIG. 2D is a sectional view of the side frame undergoing the welding process for forming the side frame in a step of assembling the seat frame.

More precisely, as shown in FIG. 2D, in the step of assembling the seat frame, a pair of jigs (pushing members) 33 are arranged across the parts of the plate 32 in the welding process of the side frames 30*s* and apply a pushing force to the parts of the plate 32 in the directions of the arrows. As a result, the front and rear ends 32*a* of the plate are pushed onto the middle horizontal part of the plate.

Needless to say, the welding of the side frames, which is performed in the step of assembling the seat frame, is not limited to laser welding. Instead, the side frames may be welded by arc welding, spot welding or the like.

In the step of the side frames 30*s*, each side frame 30*s* is formed, having cross sections having a gap and not closed. Then, in the step of assembling the seat frame, the front and rear ends of each side frame 30*s* are welded to its middle part, closing the gaps, forming a rigid structure. That is, the side frame 30*s* closes cross sections; each cross section has no longer any gaps. The front and rear ends of each side frame 30*s* are so welded while the seat frame is being assembled by means of welding. The welding in the step of forming the side frames 30*s* is an independent process. In this embodiment, the welding for providing closed cross sections in the side frames 30*s* is performed in the step of assembling the seat frames and is additional to the side frames in the step of assembling. The additional welding can be easily performed, and helps to reduce the manufacturing cost of the seat frame. This ultimately reduces the manufacturing cost of the vehicle seat.

The method of bending and bending-back of the plate in the step of forming the side frame is not limited to the method shown in FIG. 2A. Nor is the sectional shape of the side frame limited to the sectional shape shown in FIG. 2A. The plate may be bent by any other method and may have any other shape, only if it finally provides a side frame 30*s* having closed cross sections before used in the step of assembling a seat frame.

Figure 3A:
FIGS. 3A, 3B and 3C show a modified shape of the cross sections provided in the side frame of the seatback frame, FIG. 3A specifying the cross sections provided in the side frame of FIG. 2A, FIG. 3B specifying the cross sections provided in the side frame undergoing the pressing process in the step of forming the side frame, and FIG. 3C specifying the cross sections provided in the side frame undergoing the welding process in the step of assembling the seat frame.
Figure 3B:
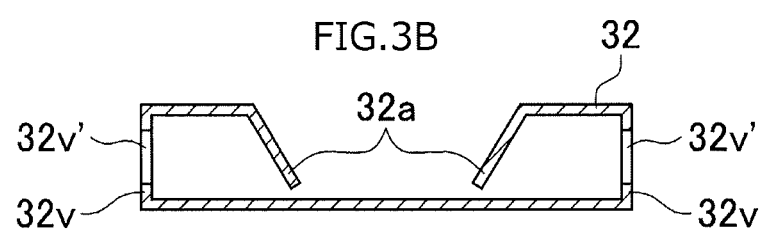
Figure 3C:
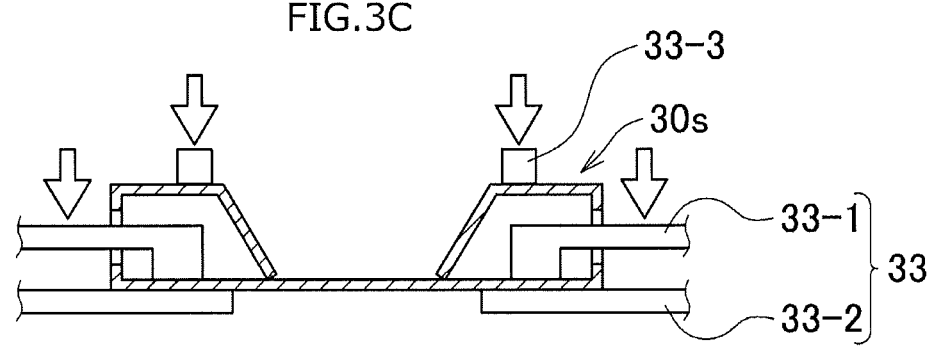

FIGS. 3A to 3C show a modified shape of the cross sections provided in the side frame. One plate 32 is continuously bent and bent back, by means of pressing, in the same way as shown in FIGS. 2A to 2D. As a result, a side frame 30*s* is formed, with the front and rear ends of the plate 32 not contacting the horizontal part of the plate 32, leaving gaps between the horizontal part of the plate 32 and the front and rear ends thereof as shown in FIGS. 3A and 3B. The side frame 30*s* then undergoes the next step (i.e., step of assembling the seat frame.)

Two holes 32*v*' are made, respectively, in those parts of the plate 32, which are left and right vertical walls 32*v*.

In the step of assembling the seat frame, the left and right ends of the plate 32 are welded to the horizontal part of the plate 32, while the ends of the horizontal part are being clamped, respectively, by two push jigs 33, each composed of two members 33-1 and 33-2. More specifically, the L-shaped distal part of the member 33-1 is inserted into each space through the holes 32*v*'. The L-shaped part of the member 33-1 opposes the other member 33-2 of the jig 33 held outside the space. The side frame 30*s* is thereby clamped between the members 33-1 and 33-2, as shown in FIG. 3C. Then, another jig 33-3 pushes the ends 32*a* of the side frame 30*s* in the direction of the arrows, onto the horizontal part of the plate 32, closing the gaps between either end of the plate 32 and the horizontal part thereof. The ends of the plate 32 are then welded to the horizontal part of the plate 32. Thus, a side frame is formed, which have closed cross sections that have no gaps, as shown in FIG. 3C.

The two push jigs 33, each composed of two members 33-1 and 33-2, clamp the side frame 30*s*. The side frame 30*s* can therefore be reliably prevented from moving during the welding process.

The holes 32*v*' are not large, each allowing only the L-shaped part of the member 33-1 to pass through. Besides, a least number of holes, e.g., two holes, are made in the left and right vertical walls 32v, respectively. Hence, the holes 32v' would not greatly decrease the rigidity of the side frame 30s.

The bending moment as large as the bending moment acting on the side frames of the seatback will not act on the side frames of the seat cushion frame. Nonetheless, it is desirable to provide closed cross sections also in the side frame of the seat cushion frame. In this invention, the side frames of either the seatback frame or the seat cushion frame, or the side frames of both the seatback frame and seat cushion frame have closed cross sections. If the side frames of either the seatback frame or the seat cushion frame have closed cross sections, the side frames of the seatback frame will have closed cross sections.

Embodiment 2

FIG. 4, FIGS. 5A to 5F and FIGS. 6A to 6F show Embodiment 2. The components of Embodiment 2, which are identical to those of Embodiment 1, are designated by the same reference numbers. The components of Embodiment 2 different from those of Embodiment 1 will be described in the main.

In the vehicle seat 10 of Embodiment 1, the seat cushion frame 20 is a substantially rectangular frame comprising left and right side frames 20s and two coupling members 20c extending between, and welded to, the left and right side frames 20s. Similarly, the seatback frame 30 is a substantially rectangular frame comprising left and right side frames 30s and two coupling members 30c extending between, and welded to, the left and right side frames 30s. The side frames 20s and 30s have been formed, each by continuously press-bending a plate.

Figure 4:
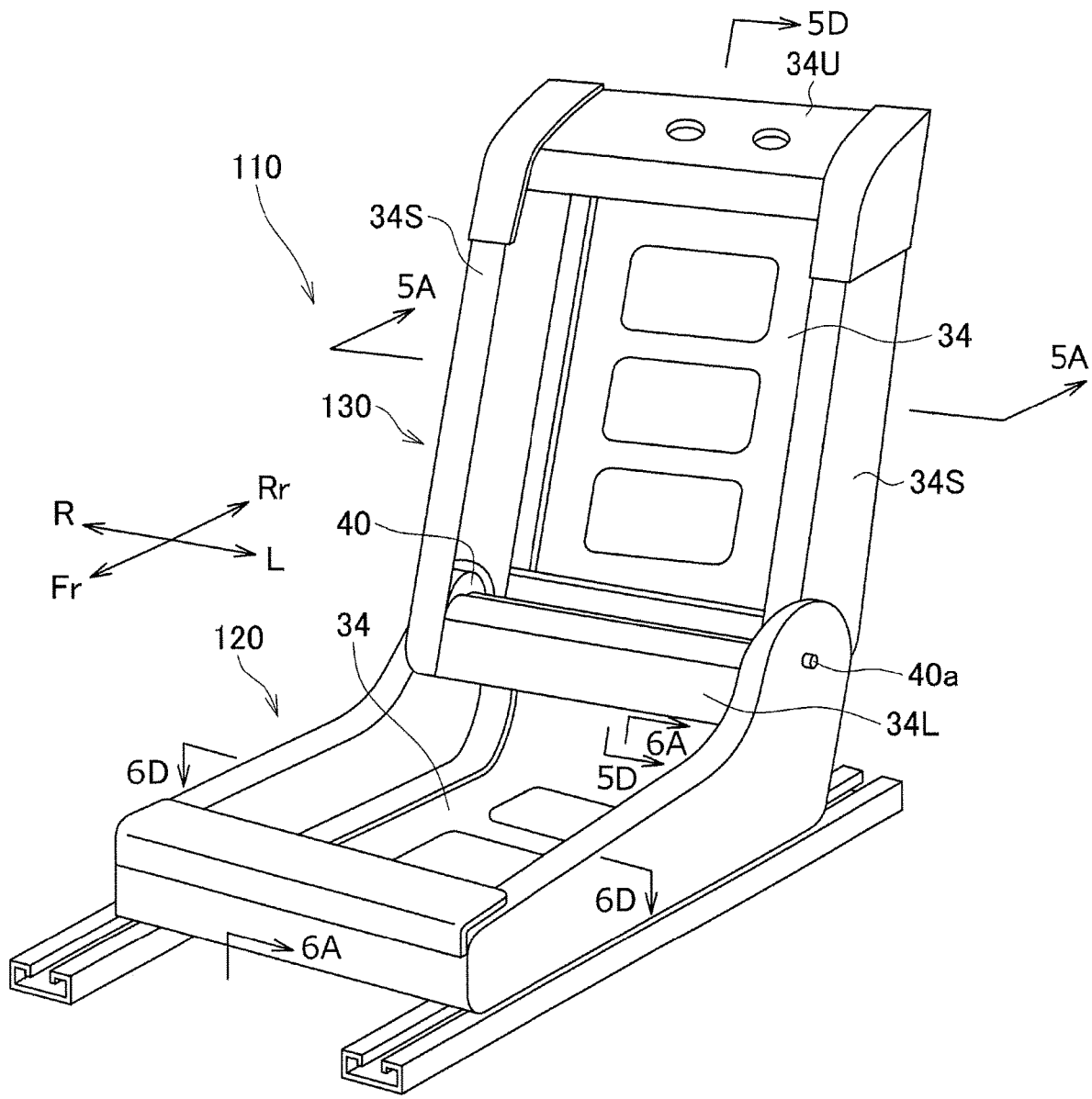
FIG. 4 is a perspective view of a vehicle seat incorporating a seat frame formed by a method according to Embodiment 2 of this invention.

The seat cushion frame 120 and seatback frame 130 of the vehicle seat 110 according to Embodiment 2 differ from those used in Embodiment 1, in some respects. That is, a back plate shaped like a rectangle is press-bent at ends, forming left and right side frames, coupling members (i.e., upper frame, lower frame, front frame and rear frame) that are integral with one another as shown in FIG. 4.

The seatback frame 130 will be described first. A rectangular base plate 34, used as a starting material, is cut at the four corners by means of press-shearing. The upper-left, upper-right, lower-left and lower-right parts of the base plate 34 are thereby cut off. Further, as shown in FIGS. 5B and 5E, the left and right edges 34s, upper edge 34U and lower edge 34L are bent by pressing, forming L-shaped parts corresponding to left and right side frames and two coupling members (i.e., upper frame and lower frame), which are integral with one another. That is, the base plate 34 is cut and bent, and has left and right ends 34s corresponding to the left and right frames, respectively, and has upper end 34U and lower end 34L corresponding to the upper and lower frames respectively. The base plate 34 has recesses 31' at the left and right ends 34s, and the upper end 34U and lower end 34L. The recesses 31' open to each other in the direction in which they oppose each other.

In addition to the base plate 34, two auxiliary plates 35 (plates 35-1 and 35-2) are press-processed. The auxiliary plates 35 are shaped to cover the openings of the upper, lower, left and right recesses define by the base plate 34. As shown in FIG. 5B, the auxiliary plate 35-1, which serves as left and right side frames and as upper rail, is shaped like letter Z, with its middle part extending substantially vertical. As shown in FIG. 5D, the auxiliary plate 35-2, which serves as lower rail, is shaped like letter U.

The left and right ends 34s, upper end 34U and lower end 34L of the base plate 34 are thus bent in the shape of L. Thus, the base plate 34 having the recesses 31' opening inwards and the four auxiliary plates 35 (i.e., Z-shaped plates 35-1 or U-shaped plates 35-2) are formed in the step of forming the seatback frame 130. The base plate 34 and auxiliary plates 35, so formed, are subjected to the next step, i.e., step of assembling the seatback frame.

In the step of assembling the seatback frame, the auxiliary plates 35 are pushed in the directions of arrows shown in FIGS. 5B and 5E, and are then welded to the base plates 34, covering the openings of the recesses 31' at the left, right, upper and lower ends of the base plate 34. The upper, lower, left and right ends (i.e., openings of the recesses 31') of the base plate are thereby closed. As a result, the upper, lower, left and right ends of the base plate have a closed cross section 31 each, providing a rigid structure, as shown in FIGS. 5A and 5D.

The four auxiliary plates 35 therefore function as cover plates that cover, respectively, the openings of the recesses 31' provided at the left and right ends 34s, upper end 34U and lower end 34L of the base plate 34. As shown in FIG. 4, the base plate 34 covers the entire back of the seatback frame 130, and can therefore be regarded as a back plate.

In the step of assembling the seatback frame, two push jigs clamp the overlapping parts of the base plate 34 and auxiliary plates 35 as shown in FIGS. 5C and 5F, pushing the auxiliary plates 35 onto the base plate 34 in the directions of the arrows. Generally, a sufficient welding strength is guaranteed in laser welding if the members are spaced by 0.1 mm or less. Hence, the base plate 34 and the auxiliary plates 35 can be laser-welded to achieve a sufficient welding strength, because the two jigs clamp the base plate 34 and the auxiliary plates 35 together, reducing the gap between the base plate 34 and either auxiliary plate 35 to 0.1 mm or less.

The two jigs 33 (more precisely, jigs 33-1 and 33-2) can be arranged in an open space in which as in Embodiment 1. In the open space, the jigs 33 clamp the base plate 34 and the auxiliary plates 35, pushing the auxiliary plates 35 onto the base plate 34 in the directions of arrows. The auxiliary plates 35 are the welded to the base plate 34. Into any space, in which a push jig cannot be arranged, a part (i.e., L-shaped distal end) of the jig 33-1 is inserted into a substantially rectangular recess 31' through a hole 32v' made in the sidewall of the base plate 34. Then, this part of the jig 33-1 and the other jig 33-2 hold and push the overlapping parts of the base plate 34 and auxiliary plate 35 in a closed space. So held in the closed space, the base plate 34 and the auxiliary plate 35 are welded to each other.

The seat cushion frame 120 will be described. Also in the seat cushion frame, the base plate 34 is formed, having opening recesses at ends. The recesses of the seat cushion frame 120 are covered with auxiliary plates 35. The auxiliary plates 35 are welded to the seat cushion frame 120, providing closed cross sections. The base plate 34 is not closed at all ends, i.e., left, right, front and rear ends, nonetheless. That is, as shown in FIGS. 6A and 6D, the base plate 34 defines closed cross sections at the left and right ends, but not at the front and rear ends.

More specifically, in the step of forming the seat cushion frame 120, the substantially rectangular base plate 34, used as a starting material, is cut at the four corners by means of press-shearing. The left and right ends of the front edge, and the left and right ends of the rear edge are thereby cut off. Further, as shown in FIGS. 6B and 6E, the left and right ends 34s are bent in the form of letter L, the front end 34Fr is bent in the form of letter I or a vertical wall 32, and the rear end 34Rr is bent or curved. The parts corresponding to the side frame and coupling members (i.e., upper frame and lower frame) are formed integral with one another. Thus, the base plate 34 is formed, having two recesses 31' at the left and right ends 34s, respectively, which open inwards (in the direction they oppose each other).

Further, two auxiliary plates 35 (i.e. plates 35-1) are press-bent, forming two substantially Z-shaped plates. The vertical parts of the Z-shaped auxiliary plates 35 extend substantially vertical, covering the openings of the recesses defined by the base plate. As will be described later, the auxiliary plates 35 function as cover plates for covering the openings of the recesses 31' defined by the left and right ends 34s of the auxiliary plates 35 (i.e., plates 35-1). Another auxiliary plate 35 (i.e., plate 35-2) is press-bent, in the form of letter L.

Thus, the base plate 34 has the left and right ends 34s bent in the form of letter L, the front end 34Fr bent in the form of letter I and the rear end 34Rr curved, in the step of forming the seat cushion frame 120. Also in the step of forming the seat cushion frame 120, the base plate 34, having recesses, at the left and right ends 34s, that open inwards, and two substantially Z-shaped auxiliary plates 35-1 and one substantially L-shaped auxiliary plate 35-2 are formed by means of pressing.

In the next step, i.e., step of assembling the seatback frame, the two auxiliary plates 35-1 are moved as shown in FIG. 6E, in the direction of the arrows, until they cover the openings of the recesses 31' provided at the left and right ends 34s of the base plate 34. Then, the auxiliary plates 35-1 are welded to the base plate 34. As a result, as shown in FIG. 6D, the upper and lower ends of the base plate 34 are closed, providing closed cross sections 31 having no gaps. Further, as shown in FIGS. 6A and 6B, the auxiliary plate 35-2 is welded to the vertical wall 32 at the front end of the base plate 34, reinforcing the lower end of the base plate.

In the step of assembling the seatback frame, the mutually overlapping parts of the base plate 34 and auxiliary plates 35 (i.e., plates 35-1 and 35-2) are clamped together as shown in FIGS. 6C and 6F in the directions of the arrows, by using two push jigs 33 (i.e., jigs 33-1 and 33-2) composed of two members (33-1 and 33-2) each. As a result, the gap between the base plate 34 and either auxiliary plate 35 is reduced to 0.1 mm or less, as needed for laser welding of sufficient strength. Hence, the base plate 34 and the auxiliary plates 35 can be welded together by means of laser welding.

The front and rear ends of the base plate 34 may be shaped like letter L as the left and right ends, by means of pressing. Further, in the step of assembling the seatback frame, the substantially Z-shaped auxiliary plates 35-1 may cover the recesses at the front and rear ends of the base plate and may be welded to the base plate, thereby to define closed cross sections at the front and rear ends of the base plate.

In Embodiment 2, too, the base plate 34 is bent, defining, at the ends, two recesses not closed. In the welding process for assembling the seatback frame, the auxiliary plates are welded to the base plate, covering the recesses made at the ends of the base plate and hence closing the recesses (thus providing closed cross sections). As a result, the base plate and the auxiliary plates constitute a rigid structure. Thus, the base plate is welded at the left and right ends corresponding to side frames, in the step of assembling the seat frame, and an additional process (i.e., secondary welding) need not be performed. This helps to lower the manufacturing cost of the seat frame, and ultimately the manufacturing cost of the vehicle seat.

In the modification of Embodiment 2, shown in FIGS. 7A to 7C, the left and right side frames are wound around pipes. More precisely, a substantially rectangular base plate 34 is cut at the four corners by means of press-shearing. The left and right ends of the base plate 34 are bent by pressing, along two pipes 36 arranged parallel at the front and rear edges of the base plate 34, respectively. The left and right ends of the base plate 34 are then wound around the pipes 36, respectively. Since the base plate is bent by pressing, its left and right ends can hardly be wound around, in close contact with, the pipes 36. Hence, the left and right ends of the base plate are spaced from the pipes as shown in FIG. 7B, and two recesses 31' having an open space are provided, respectively, at the left and right ends of the base plate.

Further, in the step of assembling the seatback frame, the left and right ends of the base plate 34, which are wound around the pipes 36, are pushed by push jigs 33-1 and 33-2 onto the pipes as shown in FIG. 7C until they contact the pipes. The gap between either end of the base plate and the associated pipe can be reduced to 0.1 mm or less, as needed for laser welding of sufficient strength. The base plate 34 can therefore be laser-welded, at the left and right ends, to the pipes 36. As a result, the recesses 31' are closed at the left and right ends of the base plate 34, providing a rigid structure having two cross sections 31 completely closed, either having no gaps at all as shown in FIG. 7A.

Since the left and right ends of the base plate 34 are first wound around the pipe 36 and then welded thereto, the welding can be performed in an open space. The welding can therefore be achieved fast and easily.

Two pipes may be arranged in parallel, one in front of the other, and then be bent in the form of an inverted U. In this case, the base plate may be wound around the pipes, not only at the ends corresponding to the left and right side frames, but also at the part corresponding to the upper frame. Alternatively, two pipes may be arranged in parallel, one in front of the other, and then be bent, forming a substantially rectangular frame. In the alternative case, the base plate may be wound around those parts of the pipes, which correspond to the left and right side frames, the upper frame and the lower frame.

Also in the seat cushion frame 120, the left and right side frames, the front frame or the rear frame, or all these frames, may be each composed of pipes and a base plate wound around the pipes at both ends, as in the case of the seatback frame 130.

In most cases, two pipes are arranged in parallel, one in front of the other. The number of pipes used is not limited to 2, nevertheless. Further, the pipes 36 are usually round pipes. Nonetheless, pipes having a non-circular cross section, such as rectangle cross section, may be used instead.

As described above, the side frame can be formed and have closed cross sections, without undergoing any additional process (e.g., secondary welding). The side frame can therefore be produced at a cost lower by the cost of an additional process (e.g., secondary welding). The seat frame, which comprises side frames, can be assembled at a low cost. Ultimately, the vehicle seat, which has the seat frame, can be assembled at a low cost.

Some embodiments of the inventions have been described, but are not intended to limit the scope of the inventions. Accordingly, various changes and modifications made without departing from the spirit or scope of the general inventive concept are, of course, all included in the present invention.

This invention can be well applied to a vehicle seat or to the seat frame thereof. Nonetheless, it can be widely applied to office seats and household seats, and also to the seat frames thereof.

Some exemplary configurations for Embodiment 2 (see FIG. 4, FIGS. 5A to 5F and FIGS. 6A to 6F) and Modification of Embodiment 2 (see FIGS. 7A to 7C) shall be described below.

Configurations for Embodiment 2:

1. A method of forming a seat frame of a vehicle seat, the seat frame being a rigid structure having closed cross sections in at least the left and right ends, not in all ends, i.e., left, right, upper and lower ends, the method comprising:

a forming step of first press-bending at least left and right ends of a substantially rectangular base plate, thereby providing recesses opening in one plane, respectively in the left and right ends, and then processing at least two auxiliary plates, thereby closing the recesses, respectively; and an assembling step of first arranging the auxiliary plates, thereby covering the recesses, and then welding the auxiliary plates to the base plate, thereby closing at least the left and right ends of the base plate and providing closed cross sections at the left and right ends of the base plate, thus forming a rigid structure having the closed cross sections.

2. A method of the type described above in paragraph 1, wherein the seat frame is a seatback frame, the method comprising:

a forming step of press-bending not only the left and right ends of the base plate, but also the upper and lower ends thereof, providing four recesses opening in one plane, respectively in the left, right, upper and lower ends, and at least four auxiliary plates are bent to close the recesses provided at the left and right ends, respectively, an assembling step of arranging the auxiliary plates, covering the openings of the recesses provided at the upper, lower, left and right ends of the base plate, and then welding the auxiliary plates to the base plate, thereby closing the recesses and hence the upper, lower, left and right ends of the base plate, thus forming a rigid structure having the closed cross sections.

3. A method of the type described above in paragraph 1 or 2, wherein the base plate and the auxiliary plates are laser-welded together while two opposing push jigs are pushing those parts of the auxiliary plates, which overlap the base plate, or while those parts of the push jigs, which extend into the recesses through holes made in the sidewalls of recesses, are pushing those parts of the base plate, which overlap the auxiliary plates.

4. A seat frame designed for use in a vehicle seat and having closed cross sections in at least left and right ends and being therefore a rigid structure, each closed cross section having been provided first by covering, with auxiliary plates, recesses made by press-bending at least the left and right ends of a rectangular base plate, and then by welding the auxiliary plates to the base plate, thereby closing the recesses.

5. A seat frame of the type described above in paragraph 4, which is a seatback frame made first by press-bending a base plate not only at the left and right ends, but also at the upper and lower ends, thereby providing recesses, then by covering the recesses with auxiliary plates and welding the auxiliary plates to the base plate, closing the recesses, thereby providing closed cross sections in the upper, lower, left and right ends of the base plate, thus forming a rigid structure.

6. A vehicle seat comprising a seat cushion composed of a seat cushion frame functioning as skeleton, a seat pad mounted on the seat cushion frame and a trim cover covering the seat pad, and a seatback composed of a seatback frame functioning as skeleton, a seat pad mounted on the seatback frame and a trim cover covering the seat pad, wherein the seat cushion frame or the seatback frame, or both, have closed cross sections in at least the left and right ends, and are therefore rigid structures, the closed cross sections having been provided by first press-welding at least left and right ends of a substantially rectangular base plate, thereby providing recesses, and then welding auxiliary plates to the base plate, thereby closing the recesses.

Configurations for Modification of Embodiment 2:

1. A method of forming a seat frame of a vehicle seat, the side frame being a rigid structure having closes cross sections in at least the left and right ends, not in all ends, i.e., left, right, upper and lower ends, the method comprising:

a step of bending the left and right ends of a substantially rectangular base plate, around a plurality of pipes arranged parallel in the front-rear direction of the seat frame, thereby providing recesses at the left and right ends of the base plate; and a step of welding the left and right ends of the base plate to the pipes, closing the recesses and providing closed cross sections in the left and right ends of the base plate, thereby forming a rigid structure.

2. A method of the type described above in paragraph 1, wherein the left and right ends of the base plate are laser-welded while the left and right ends of the base plate are being pushed to the pipes, respectively.

3. A seat frame designed for use in a vehicle seat, having left and right side frames and closed cross sections in the left and right side frame, and therefore being a rigid structure, closed cross sections having been provided first by bending a substantially rectangular base plate around a plurality of pipes arranged parallel in the front-rear direction of the seat frame, thereby providing recesses at the left and right ends of the base plate, and then welding the left and right ends of the base plate to the pipes, thereby closing the recesses.

4. A vehicle seat comprising a seat cushion composed of a seat cushion frame functioning as skeleton, a seat pad mounted on the seat cushion frame and a trim cover covering the seat pad, and a seatback composed of a seatback frame functioning as skeleton, a seat pad mounted on the seatback frame and a trim cover covering the seat pad, wherein both the seat cushion frame and the seatback frame have left and right side frames, the left and right frames of the seat cushion frame or seatback frame, or both, have closed cross sections, constituting a rigid structure, closed cross sections having been provided first by bending a substantially rectangular base plate around a plurality of pipes arranged parallel in the front-rear direction of the seat frame, thereby providing recesses at the left and right ends of the base plate, and then welding the left and right ends of the base plate to the pipes, thereby closing the recesses.

What is claimed is:

1. A method of forming a seat frame of a vehicle seat, by arranging coupling members between left and right side frames formed of plates, welding the coupling members to the left and right side frames, thereby assembling a substantially rectangular seat frame, the method comprising:

bending the front and rear ends of each side frame formed of a plate to a same direction, providing open cross sections, each with a gap, between one surface of the side frame and, the front and rear ends of the side frame; and welding each side frame in a step of assembling the seat frame, providing closed cross sections and thereby forming a rigid structure having no gaps.

2. The method according to claim 1, wherein the front and rear ends of each side frame are press-bent, providing U-shaped recesses, and are then bent back, covering the recesses, thereby providing cross sections having a gap, at the front and rear ends of side frame;

and the ends of the side frame are welded, while held together by a push jig in the step of assembling the seat frame, providing closed cross sections and hence forming the rigid structure.

3. The method according to claim 2, wherein a part of the push jig is inserted into a substantially rectangular recess through a hole made in a sidewall of the recess and clamp the side frame jointly with another push jig, and still another jig pushes the front and rear ends of the side frame, and the side frame so clamped is welded in the step of assembling the seat frame, thereby providing closed cross sections and hence forming the rigid structure.

4. The method according to claim 3, wherein the welding performed in the step of assembling the seat frame is laser welding.

5. The method according to claim 1, wherein the front and rear ends of each side frame are first press-bent and are then bent back, providing U-shaped recesses, and the front and rear ends of each side frame, which define the ends of the U-shaped recesses, are inclined inwards, thus closing the recesses; and the side frame so inclined are welded, while held together by a push jig in the step of assembling the seat frame, thereby providing closed cross sections and hence forming the rigid structure.

6. The method according to claim 5, wherein a part of the push jig is inserted into a substantially rectangular recess through a hole made in a sidewall of the recess and clamp the side frame jointly with another push jig, and still another jig pushes the front and rear ends of the side frame, and the side frame so clamped is welded in the step of assembling the seat frame, thereby providing closed cross sections and hence forming the rigid structure.

7. The method according to claim 6, wherein the welding performed in the step of assembling the seat frame is laser welding.

* * * * *